US011358494B2

(12) United States Patent
Nawrocki et al.

(10) Patent No.: US 11,358,494 B2
(45) Date of Patent: Jun. 14, 2022

(54) INTERIOR ADJUSTMENT SYSTEM

(71) Applicant: Brose Fahrzeugteile GmbH & Co. Kommanditgesellschaft, Bamberg (DE)

(72) Inventors: Stephen Nawrocki, Royal Oak, MI (US); Reinhold Hopf, Küps (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 669 days.

(21) Appl. No.: 16/183,148

(22) Filed: Nov. 7, 2018

(65) Prior Publication Data

US 2020/0139853 A1 May 7, 2020

(51) Int. Cl.
| | |
|---|---|
| *B60N 2/02* | (2006.01) |
| *B60N 2/829* | (2018.01) |
| *B60N 2/853* | (2018.01) |
| *B60N 2/12* | (2006.01) |
| *B60N 2/16* | (2006.01) |
| *B60N 2/20* | (2006.01) |

(52) U.S. Cl.
CPC ......... *B60N 2/0252* (2013.01); *B60N 2/0232* (2013.01); *B60N 2/12* (2013.01); *B60N 2/1635* (2013.01); *B60N 2/20* (2013.01); *B60N 2/829* (2018.02); *B60N 2/853* (2018.02); *B60N 2002/0256* (2013.01); *B60N 2002/0272* (2013.01)

(58) Field of Classification Search
CPC .... B60N 2002/0272; B60N 2002/0268; B60N 2/0252; B60N 2/829; B60N 2/853; B60N 2/0232; B60N 2/12; B60N 2/1635; B60N 2/20; B60N 2002/0256

USPC .......................................................... 701/36
See application file for complete search history.

(56) References Cited

U.S. PATENT DOCUMENTS

| | | | | |
|---|---|---|---|---|
| 4,669,780 | A | * | 6/1987 | Sakakibara .......... B60N 2/0232 297/257 |
| 6,507,779 | B2 | | 1/2003 | Breed et al. |
| 7,145,263 | B2 | | 12/2006 | Nathan et al. |
| 7,647,151 | B2 | | 1/2010 | Abt et al. |
| 2008/0009958 | A1 | * | 1/2008 | Abt ..................... B64D 11/0605 700/29 |
| 2016/0280096 | A1 | | 9/2016 | Bonk et al. |

(Continued)

FOREIGN PATENT DOCUMENTS

| | | |
|---|---|---|
| DE | 102016204067 A1 | 9/2017 |
| DE | 102017129163 A1 | 6/2018 |
| WO | 2018016770 A1 | 1/2018 |

*Primary Examiner* — Nadeem Odeh
(74) *Attorney, Agent, or Firm* — Brooks Kushman P.C.

(57) ABSTRACT

A vehicle interior system including a first seat assembly, disposed within a vehicle cabin, a first sensor, a second sensor, and a controller is provided. The first and second sensors may each be disposed within the vehicle cabin. The first sensor may be configured to obtain first signals indicative of a positioning of an obstacle within a predetermined coordinate system. The second sensor may be configured to obtain second signals indicative of a positioning of the first seat assembly within the predetermined coordinate system. The controller may be configured to receive the signals from the first sensor and to map a portion of the obstacle based on the first signals and relative to a portion of the first seat assembly within the predetermined coordinate system.

9 Claims, 5 Drawing Sheets

(56) References Cited

U.S. PATENT DOCUMENTS

| | | | |
|---|---|---|---|
| 2017/0158087 A1* | 6/2017 | Kwon | B60N 2/0232 |
| 2018/0065505 A1* | 3/2018 | Ewert | B60R 21/16 |
| 2018/0111511 A1* | 4/2018 | Lota | B60N 2/0232 |
| 2018/0154799 A1* | 6/2018 | Lota | B60K 35/00 |
| 2018/0264975 A1 | 9/2018 | Bonk et al. | |
| 2018/0272977 A1* | 9/2018 | Szawarski | B60N 2/04 |
| 2018/0297489 A1 | 10/2018 | Szawarski et al. | |
| 2019/0118675 A1* | 4/2019 | Koh | B60N 2/06 |
| 2019/0199799 A1* | 6/2019 | Asher | B60R 16/037 |
| 2019/0299895 A1* | 10/2019 | Herbert | G06K 9/00369 |
| 2019/0303729 A1* | 10/2019 | Gramenos | G06K 9/00832 |
| 2021/0221258 A1* | 7/2021 | Ekchian | B60N 2/809 |

* cited by examiner

INTERIOR ADJUSTMENT SYSTEM

TECHNICAL FIELD

The present disclosure relates to a positioning system and a method of operating the same for vehicle interior components.

BACKGROUND

Vehicles generally include one or more adjustable and reconfigurable seat assemblies disposed within the vehicle cabin. For example, one or more of the seat assemblies may be adjusted to provide easier ingress and egress to the vehicle cabin. One or more of the seat assemblies may interfere or collide with one another or an object disposed within the vehicle cabin.

SUMMARY

According to one embodiment, a vehicle interior system including a first seat assembly, disposed within a vehicle cabin, a first sensor, a second sensor, and a controller is provided. The first and second sensors may each be disposed within the vehicle cabin. The first sensor may be configured to obtain first signals indicative of a positioning of an obstacle within a predetermined coordinate system. The second sensor may be configured to obtain second signals indicative of a positioning of the first seat assembly within the predetermined coordinate system. The controller may be configured to receive the signals from the first sensor and to map a portion of the obstacle based on the first signals and relative to a portion of the first seat assembly within the predetermined coordinate system.

According to another embodiment, a vehicle interior system including a first seat assembly, disposed within a vehicle cabin, a first sensor, a second sensor, and a controller is provided. The first sensor may be sensor disposed within the vehicle cabin and configured to obtain first signals indicative of a positioning of the first vehicle seat within a predetermined coordinate system. The second sensor may be disposed within the vehicle cabin and configured to obtain second signals indicative of a positioning of the second seat assembly within the predetermined coordinate system. The controller may be configured to receive the signals from the first sensor to map a portion of the first seat assembly based on the first signals and relative to a portion of the second seat assembly based on the second signals within the predetermined coordinate system.

According to yet another embodiment, a method of controlling relative movement of interior assemblies disposed within an interior of a vehicle provided with a first interior assembly and a second interior assembly is provided. The method may include: receiving first signals indicative of a positioning of the first interior assembly within a predetermined coordinate system, receiving second signals indicative of a positioning of a second interior assembly within a predetermined coordinate system, and mapping a portion of the first interior assembly based on the first signals relative to a portion of the second seat assembly based on the second signals within the predetermined coordinate system.

DETAILED DESCRIPTION

Figure 1:
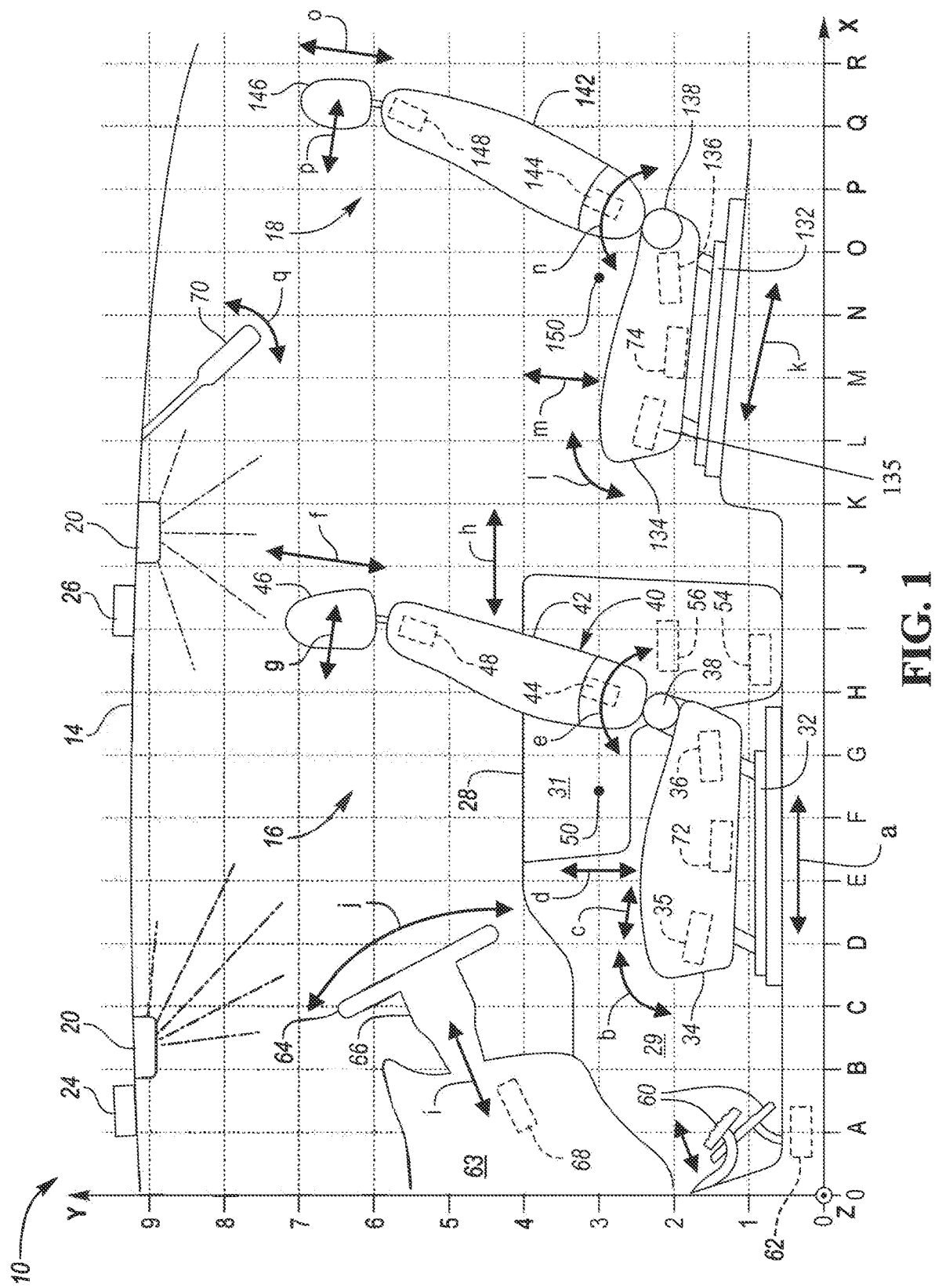
FIG. 1 illustrates a plan view of an exemplary vehicle interior and an x-y coordinate system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle interiors include various interior assemblies disposed within the vehicle interior that may be adjusted or reconfigured. Under certain circumstances, when one or more of the interior components are actuated, one of the interior assemblies may collide with another interior component. The vehicle interior may include one or more sensors, such as, a front sensor 20 and a rear sensor 20, that may be attached to the vehicle roof 14. The sensors may be configured to receive signals that indicate positions of the interior components and provide the signals to a controller 80. The controller 80 may map portions of the interior assemblies within a predetermined coordinate system.

The term sensors may refer to the visual sensors 20 attached to the vehicle roof 14 or be positioned in other suitable locations within the vehicle interior. The terms sensor may also refer to one or more sensors (e.g., hall sensor, optical or capacitive encoders, resolvers, current sensors, ripple counters) within or operatively coupled to a motor (e.g., length adjust motor 72, recliner motor 44, height adjust motor 36, and all other motors described herein). Therefore, when a motor is referenced, the motor includes the sensor and the motor collectively.

Figure 2:
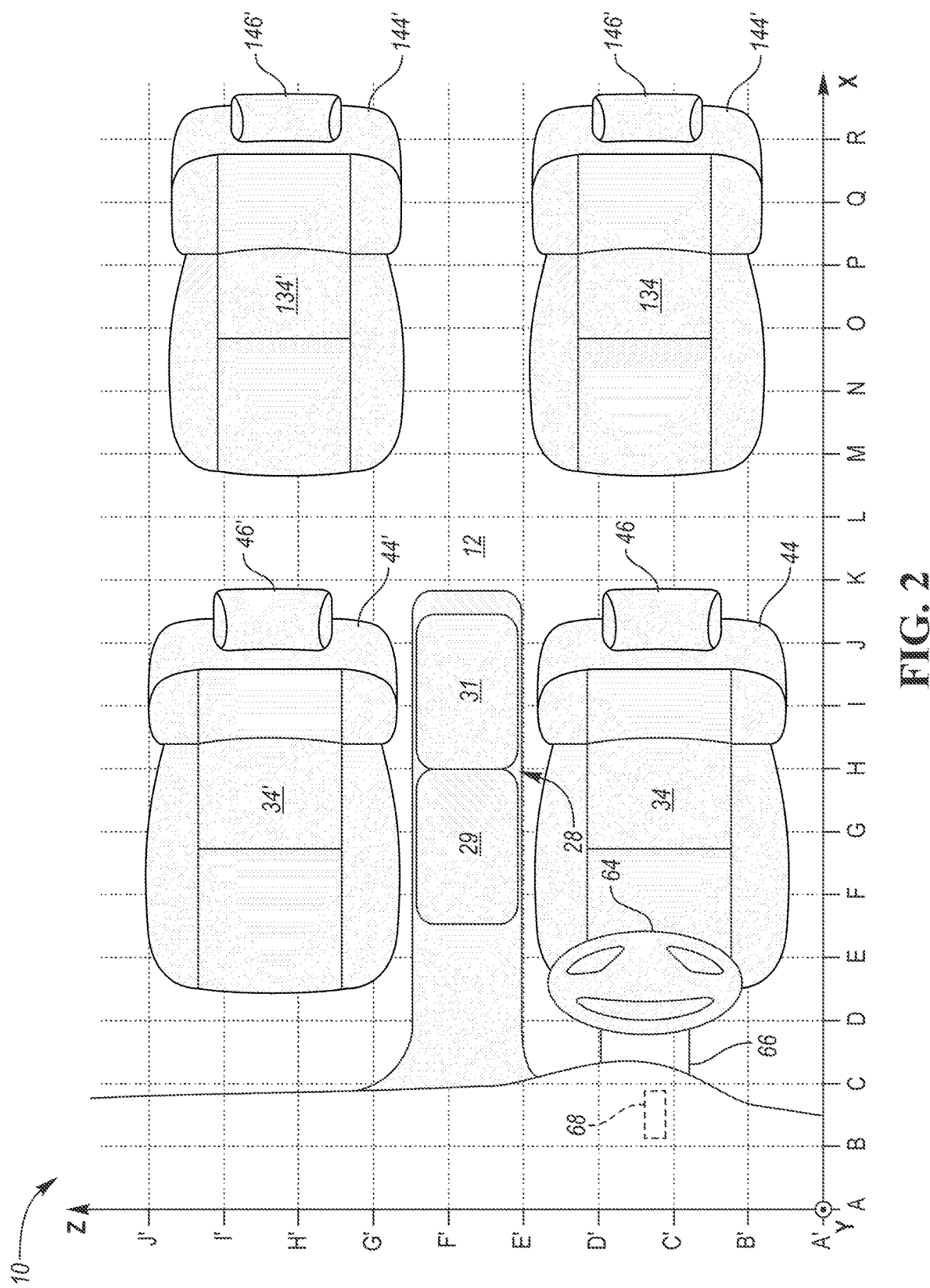
FIG. 2 illustrates an x-z coordinate system of the vehicle interior in FIG. 1.

FIG. 1 illustrates a plan-view of the vehicle cabin, such as an interior, of the vehicle 10. FIG. 2 illustrates a top view of the same. The vehicle 10 includes a floor 12 and a ceiling 14 that is disposed above the floor 12. The vehicle interior 10 includes the first seat assembly 16, such as a first-row-driver seat assembly and the second seat assembly 18, such as a second-row driver-side seat assembly. The first-row driver seat assembly may include a track assembly 32 comprised of a pair of upper rails and lower rails. The upper rail of the track assembly 32 may be configured to move (e.g., slide or translate, articulate) in a longitudinal direction a in response to actuation of a length adjuster motor 72. A cushion assembly 34 may be coupled to the track assembly 32 so that the cushion assembly 34 translates with the track assembly 32.

In one or more embodiments, the track assembly 32 may include one or more rails that is disposed within or below the vehicle floor 12.

The cushion assembly 34 may include a tilt adjustment motor 35 that may be configured to pivot a front portion of the cushion assembly 34 to alter or adjust a portion of the cushion assembly 34 along a directional arrow b. As another example, a front portion of the cushion assembly 34 may move (e.g., slide or translate, articulate) along the directional arrow c. The cushion assembly 34 may be provided with a height adjust mechanism that is provided with a height adjustment motor 36. The height adjustment motor may move the cushion assembly 34 vertically, such as along the directional arrow d. A backrest 42 may be attached to the cushion assembly 34 by a recliner 38. The recliner 38 may facilitate pivoting movement of the backrest 42 with respect to the cushion assembly 34 along the pivoting directional arrow e. The recliner may be actuated by powering a recliner motor 44 that is coupled (e.g., directly or indirectly) to the recliner 38.

An adjustable head rest 46 may extend from the backrest 42. The adjustable headrest 42 may be actuated by a headrest motor 48 to move the head rest 46 vertically, along the directional arrow f, and horizontally, along the directional arrow g.

A center console 28 may be disposed within the vehicle cabin 10 adjacent to the first first-row-driver seat assembly 16. The center console 28 may include a fixed portion 29 and a moving portion 31 that may move (e.g., slide, translate) with respect to the fixed portion 29. The center console 28 may include a mechanism provided with a center console adjustment motor 56 that may be actuated to move the moving portion 31 away from the fixed portion 29 along the directional arrow h.

Vehicle pedals 60 may be disposed in front of the first-row-driver seat assembly 16. The pedals 60 may be coupled to a pedal adjustment mechanism that may include a pedal adjustment motor 62. The pedal adjustment motor 62 may be actuated to adjust translate the vehicle pedals in a forward and rearward direction. A dashboard 63 may be disposed above the vehicle pedals 60 and include a steering wheel 64. The steering wheel 64 may include a steering adjustment mechanism that includes a steering wheel adjustment motor 68 that may translate along the directional arrow i. The steering wheel adjustment motor 68 may also rotate or pivot the steering wheel 64 and steering column 66 along the directional arrow j.

The vehicle interior 10 may also be provided with a second-row driver-side seat assembly disposed behind the first-row driver seat assembly. As will be described in greater detail below, the second-row driver-side seat assembly may include similar or identical components and subassemblies as the first-row driver side seat assembly. In one or more embodiments, the second-row driver-side seat assembly may be adjusted manually.

The second-row driver seat assembly may include a track assembly 132 comprised of a pair of upper rails and lower rails. The upper rail of the track assembly 132 may be configured to move (e.g., slide or translate, articulate) in a longitudinal direction a in response to actuation of a length adjuster motor 74. A cushion assembly 134 may be coupled to the track assembly 132 so that the cushion assembly 134 translates with the track assembly 132 along the directional arrow k.

The cushion assembly 134 of the second-row seat assembly 18 may include a tilt adjustment motor 135 that may be configured to pivot a front portion of the cushion assembly 134 to alter or adjust a portion of the cushion assembly 134 along a directional arrow 1. As another example, a front portion of the cushion assembly 134 may move (e.g., slide or translate, articulate) along the directional arrow 1. The cushion assembly 134 may be provided with a height adjust mechanism that is provided with a height adjustment motor 136. The height adjustment motor 136 may move the cushion assembly 134 vertically, such as along the directional arrow m. A backrest 142 may be attached to the cushion assembly 134 by a recliner 138. The recliner 138 may facilitate pivoting movement of the backrest 142 with respect to the cushion assembly 134 along the directional arrow n. The recliner may be actuated by powering a recliner motor 144 that is coupled (e.g., directly or indirectly) to the recliner 138.

An adjustable head rest 146 of the second-row seat assembly 18 may extend from the backrest 142. The adjustable headrest 146 may be actuated by a headrest motor 148 to move the head rest 146 vertically, along the directional arrow o, and horizontally, along the directional arrow p.

One or more sensors may be fixed to the roof 14 of the vehicle 10. For example, a sensor 20 may be fixed to the roof 14 of the vehicle 10. The sensors 20 may include a controller or electronic control unit (ECU) 24, 26 and may be one of several types of sensor e.g., capacitance, visual, or optical. In one or more embodiments, a Lidar sensor configured to measure a distance to a target by illuminating the target with a pulsed laser light may be used. As another example, radar sensors may be used to measure positions of various components within the vehicle interior 10.

In one or more embodiments, an entertainment system including a display 70 may be provided in the vehicle interior 10. The display 70 may be pivotally attached to the vehicle roof 14 and moveable between a stowed position and a deployed position along the directional arrow q.

The controller 80 (FIG. 3) may receive signals indicative of one or more positions of one or more components or assemblies within the vehicle interior, or obstacles (movable or static), or both within the predetermined coordinate system. The signals may be received from the motors disposed within the assemblies, or the sensors 20, or both. The controller 80 may map portions of the obstacle(s), or assemblies, or both. In response to receiving these signals, the controller 80 may provide signals to alter or stop actuation or movement of one or more of the assemblies to avoid a collision.

In one or more embodiments, the steering wheel adjustment motor 68 may provide the relative position of the steering wheel column 66 and wheel 64 within the x-y axis of the predetermined coordinate system (e.g., D 4) to the controller 80. In response to actuation or a request to actuate the steering wheel adjustment motor 68, or one or more portions of the first seat assembly 16, or both, the controller 80 may provide one or more signals to the steering wheel adjustment motor 68, or one of the motors of the first seat assembly 16, or both to alter their respective positions within the predetermined coordinate system. As one example, in response to actuation of the length adjust motor 72, along the directional arrow a, and actuation of the recliner motor 44, along the directional arrow e towards the steering wheel 64, a collision between the steering wheel 64 and the headrest 46 may be predicted. In response to the predicted collision, the headrest adjustment motor 48 may be actuated to retract the headrest 46 along the directional arrow f, or the steering wheel adjustment motor 68 may be actuated to move the steering wheel along the directional arrow i, or both the steering wheel 64 and the headrest 46 may be actuated.

Similarly, the pedals 60 may be adjusted by the pedal adjustment motor 62 to alter their relative position to the first seat assembly 16 within the predetermined coordinate system.

In one or more embodiments, the sensors 20 may provide a relative position of the display 70, the roof 14, or a backrest assembly 42 within the x-y axes of the predetermined coordinate system to the controller 80. In response to actuation or a request to actuate one or more portions the second-row seat assembly 18, the controller 80 may predict a collision between the headrest 146 and the roof 14 or display 70, or backrest 42. In response to the predicted collision, the controller may provide one or more signals to stop or alter the rotation of the length adjustment motor 74, the height adjustment motor 136, the recliner motor 144, the headrest adjustment motor 148, or some combination thereof to avoid the predicted collision.

Figure 1A:
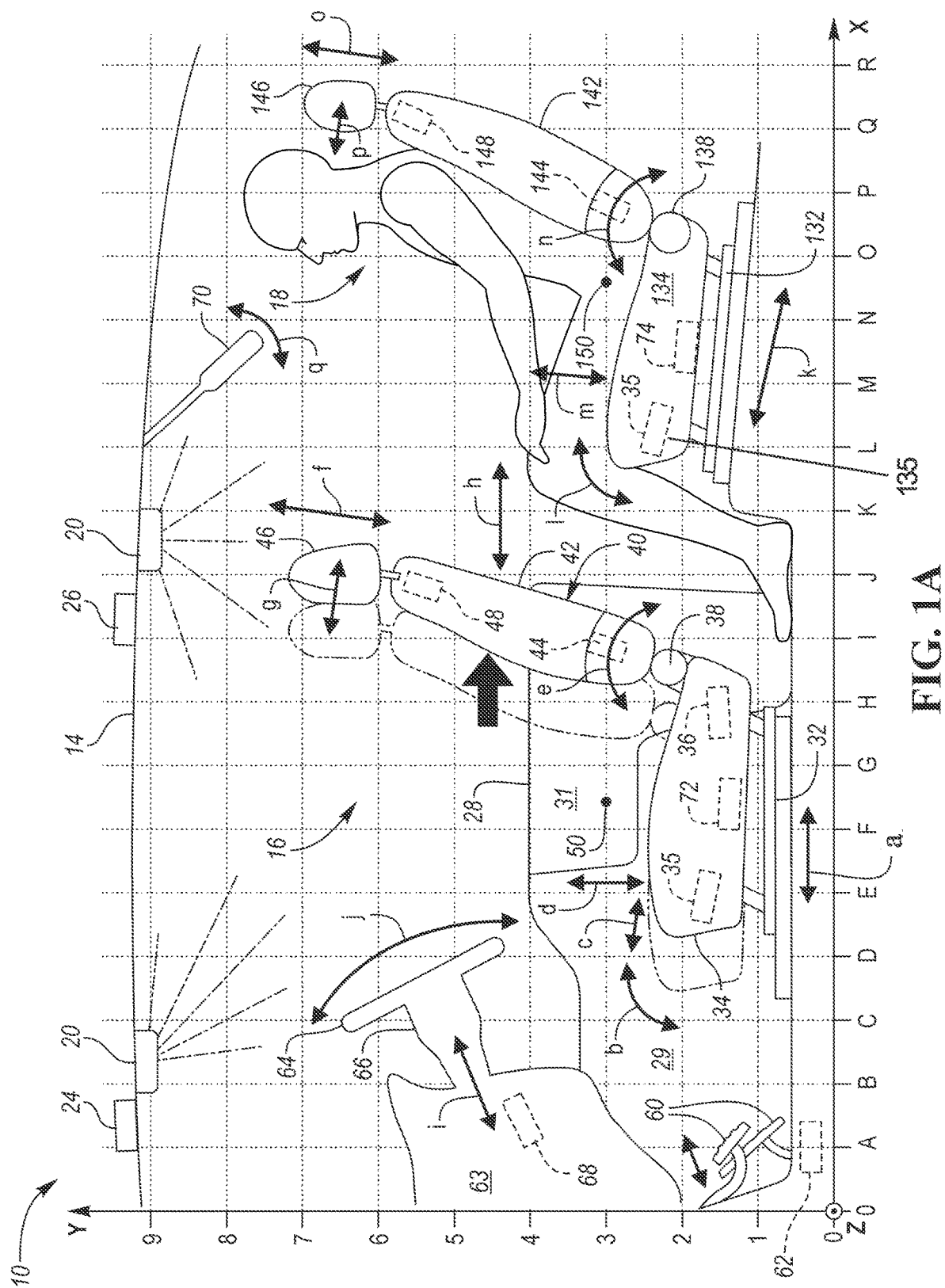
FIG. 1A illustrates a partial-plan view of the vehicle interior and the x-y coordinate system.

FIG. 1A illustrates a detailed view of a portion of the vehicle interior 10 that includes an occupant seated in the second-row seat assembly 18. In response to one or more triggers or actions, the sensors 20 emit and receive signals within the vehicle cabin 10 that are indicative of one or more positions of the occupant seated in the second-row seat assembly 18. For example, the sensors 20 may receive signals that indicate a portion of the occupant's legs extend approximately between coordinates J1 and K4. The coordinates of the occupant's legs may be compared or mapped relative to one or more portions of the first-row seat assembly 16. For example, the controller may compare the coordinates of the occupant's legs to the rear portion of the cushion assembly 34, H1 and I2, as well as the back-frame assembly 40 I2 and J5. One or more of these coordinates may be obtained by one or more sensors included within or operatively connected to motors of the first seat assembly 16. Also, one or more of these coordinates of the first-row seat assembly 16 may be obtained or verified by the sensors 20.

In one or more embodiments, the length adjuster motor 72 of the cushion assembly 34 may provide its relative position within the x-axis of the predetermined coordinate system (e.g., F) to the controller 80. The height adjust motor 36 may provide its relative position within the x-y axis of the predetermined coordinate system (e.g., H 1.5) to the controller 80. Likewise, the recliner motor 44 may send signals to the controller 80 that are indicative of its relative position within the x-y axis (e.g., H 1.5). The controller 80 may be programmed to include the dimensions of the backrest 42 and the cushion assembly 34 at least partially based on the aforementioned coordinates.

In response to one or more trigger conditions, such as requesting actuation of or actuating the length adjust motor 72, the controller 80 may predict a collision between the back-rest assembly 42 or the cushion assembly 34, or both and the legs of one or more occupants in the second-row seat assembly 18. The controller 80 may then send a signal to the length adjust motor 72 to stop the motor 72 or reverse the rotational direction of the motor 72. In one or more embodiments, the controller 80 may send signals to the length adjust motor 74 of the second-row seat assembly 18 to actuate or move the second-row seat assembly 18 rearward along the directional arrow k to avoid the collision.

In one or more embodiments, the controller 80 may send the signals in response to the position of one or more portions of the seat assembly 16 being within a predetermined distance of the occupant's legs. For example, the distance between each vertical line within the predetermined coordinate axis may represent 20 mm. and the predetermined distance may be 5 mm. or 25% of the distance between two vertical lines of the predetermined coordinate system.

The controller 80 may provide signals indicative of a predicted collision in response to changing positions of one or more portions of the seat assembly 16 with respect to the predetermined coordinate system and an obstacle (e.g., occupant's legs, other interior component) over a predetermined period (e.g., seconds). In response, the controller 80 may alter (e.g., increase, decrease) the speed of operation of one or more of the motors within the seat assembly 16 to avoid the predicted collision.

In one or more embodiments, the predetermined distance and changing positions of the one or more portions of the seat assembly 16 with respect to the predetermined coordinate system and obstacles may be referred to as a hindrance condition.

Figure 3:
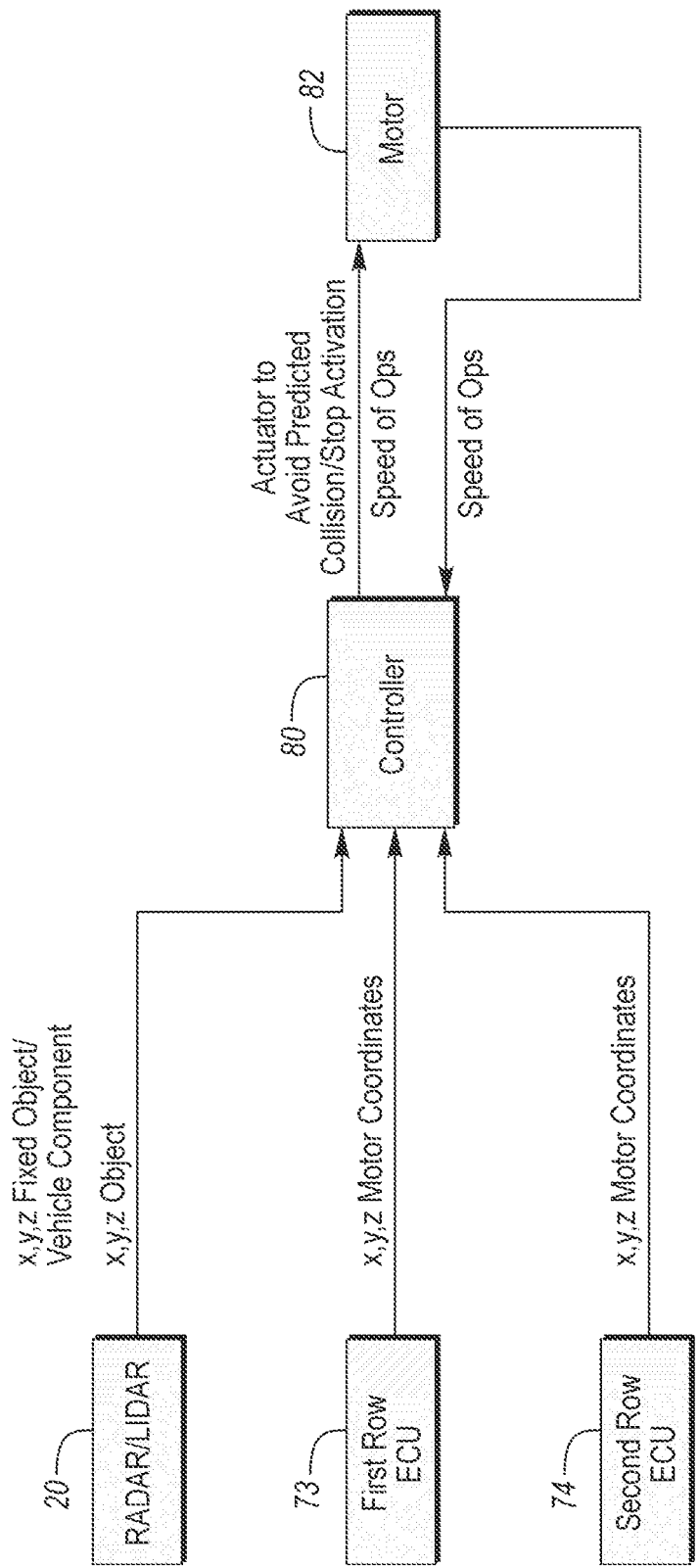
FIG. 3 illustrates an exemplary schematic diagram.

FIG. 3 illustrates an exemplary schematic diagram of a control system 300. The sensors 20 may each include an electronic control unit 24 and 26, respectively. The sensors 20 may receive one or more positions of one or more of the vehicle interior components or one or more objects within the vehicle interior within the predetermined coordinate system. The positions may be communicated to the controller 80. The motors of the first seat assembly 16 may communicate with a first row ECU 73 and the motors of the second-row seat assembly 18 may communicate with a second row ECU 75. The first row ECU 73 and the second row ECU 75 may communicate the relative positions of the motors within the predetermined coordinate system to the controller 80. The controller may map one or more portions of the vehicle components, or objects, or both, within the vehicle interior 10. The controller 80 may be programmed to include relative dimensions of the first seat row seat assembly 16 and the second-row seat assembly 18. The controller may predict a collision based on the dimensions and relative positions received from the sensors 20, first row ECU 73, or second row ECU 74, or some combination thereof.

The controller 80 may send signals to one or more motors within the vehicle interior 10, collectively referred to as motor 82, to actuate one or more portions of one or more vehicle components. The controller may specify the speed of operation (speed of ops) of the one or more motors 82. One or more of the motors 82 may communicate the actual or recorded speed of ops to the controller 80. To avoid the collision, the controller 80 may stop, reverse, or slow the speed of ops of the motors 82.

Figure 4:
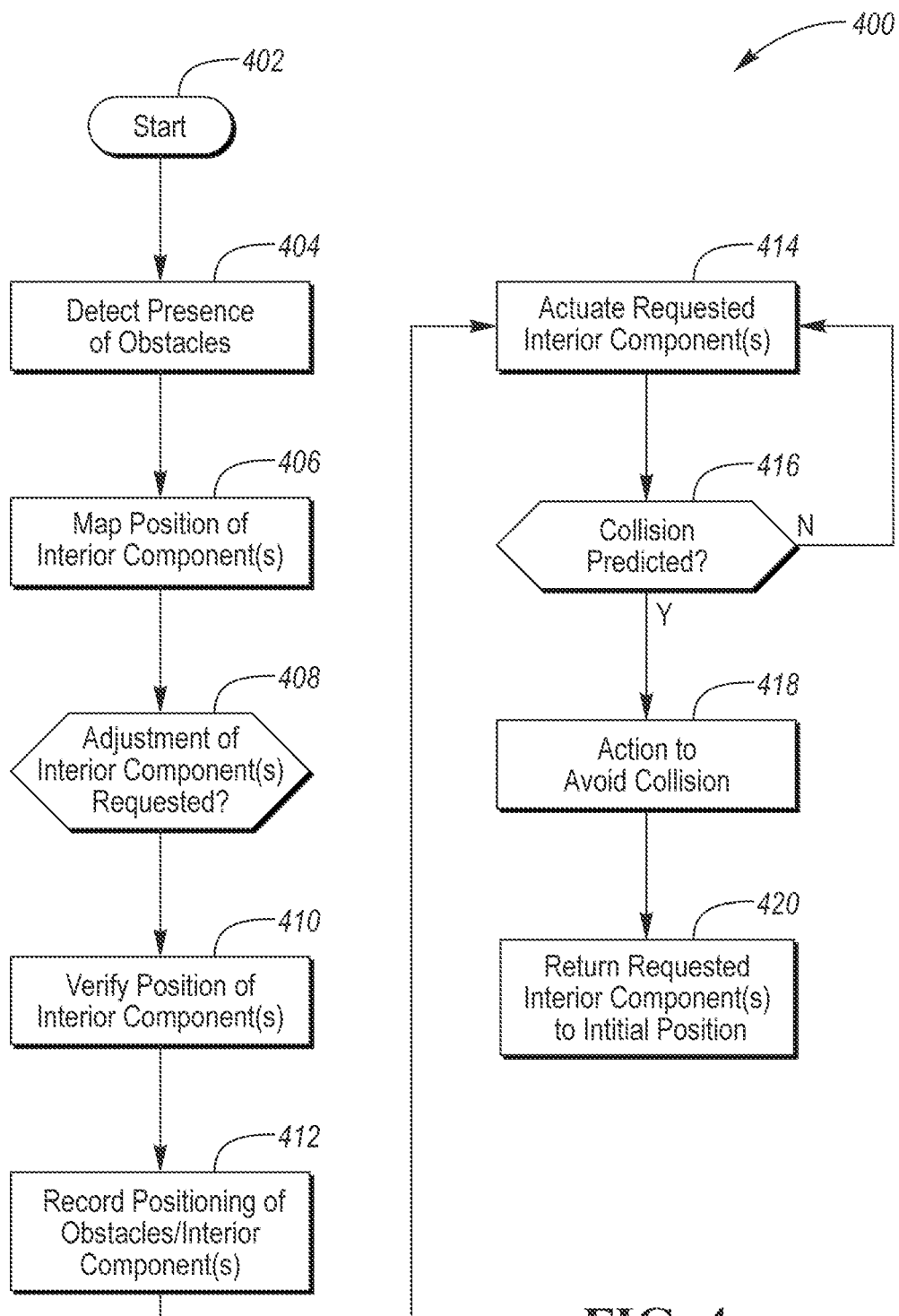
FIG. 4 illustrates a flow chart of an exemplary method of operating an exemplary interior adjustment system.

Control logic or functions performed by the controller 80 may be represented by flow charts or similar diagrams, such as the flow chart 400 in FIG. 4. FIG. 4 provides a representative control strategy and/or logic that may be implemented using one or more processing strategies such as polling, event-driven, interrupt-driven, multi-tasking, multi-threading, and the like. As such, various steps or functions illustrated may be performed in the sequence illustrated, in parallel, or in some cases omitted.

The controller 80 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 80 in controlling one or more assemblies within the vehicle interior.

Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein but is provided for ease of illustration and description. The control logic may be implemented primarily in software executed by a microprocessor-controlled vehicle, motors 82, or ECUs illustrated in FIG. 3.

The control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of several known physical devices that utilize electric, magnetic, and/or optical storage to keep executable instructions and associated calibration information, operating variables, and the like.

The control strategy may start in response to one or more trigger events, represented by operation 402. As one example, the strategy may include the controller 80 receiving signals indicative or a user approaching the vehicle through a key fob, mobile device, or other suitable means. As another example, the process may start in response to a user entering the vehicle or opening the vehicle door. One or more sensors 20 may emit and provide signals that are indicative of obstacles within the vehicle interior 10. The signals may indicate the presence of the obstacles as well as the location or positioning of the obstacles within the predetermined coordinate system. For example, if an obstacle (e.g., package or bag) is disposed near coordinates H, 0.5, C', the sensors would communicate these coordinates to the controller 80.

After operation 404, the controller 80 may branch to operation 406, to monitor or detect the positioning of one or more of the interior components (e.g., first seat assembly 16, second seat assembly 18) within the vehicle interior 10. One or more motors 82 within the first seat assembly 16 or the first row ECU 73 may provide signals to the controller 80 of their respective positions within the predetermined coordinate system. The controller 80 may then determine or map the positioning of the first seat assembly 16, as a whole, within the predetermined coordinate system. For example, the length adjust motor 72 may provide a signal indicative of its position along the x-axis to the controller 80. The controller 80 may also map portions of the seat assembly based on dimensions programmed within the controller 80.

The controller may receive a request to adjust one or more of the interior components, as represented by operation 408. The controller may receive the request in response to one or more trigger conditions. In one or more embodiments, the operation of a switch disposed within the vehicle cabin may be the trigger conditions. As another example, the trigger condition may be recognition of one or more users approaching the vehicle.

In one or more embodiments, the controller 80 may receive signals from the sensors 20 that are indicative of the positioning of the interior components. The positioning based on the signals from the sensors 20 may be compared to the positioning associated with operation 406. Although not explicitly illustrated, if the positioning associated with operation 406 differs from the positioning associated with operation 410 by a predetermined value, the controller 80 may return to operation 406.

In operation 412, the controller 80 may record, such as store, the positioning of one or more of the obstacles detected in operation 410, or the positioning the vehicle interior components mapped in operation 406, or some combination thereof.

The controller 80 may provide signals to the ECUs 73, 75, or motors 82, or some combination thereof to actuate one or more of the interior components, as represented by operation 414. The controller 80 may then predict a collision between at least one of the interior components and at least one of the obstacles. This predicted collision may be determined based on a number of data points, such as a predetermined distance along the coordinate map, a predetermined distance and speed of operation of the actuated components with respect to a fixed obstacle or interior component, distance and speed of operation between two interior components moving with respect to each other. In one or more embodiments, an occupant's size, seating position of an occupant, or some combination thereof may be detected by the sensors 20 and provided to the controller so that the controller may detected a potential collision based on the occupant's size or the occupant's seating position.

If a collision is predicted in operation 416, the controller may branch to operation 418 and take suitable action to avoid the collision. The controller may send a signal to reverse the rotational direction of one or more of the motors 82 to change the directional movement of the associated interior component(s). In one or more embodiments, the controller 80 may send a signal to stop the actuation of one or more of the motors 82. Also, the controller 80 may alter (e.g., increase or decrease) the speed of operation of one or more interior components to avoid a collision. For example, if two or more vehicle interior components are actuated at the same time and there is a predicted collision at a given point of time, the speed of operation of either interior component may be altered to avoid the predicted collision.

In one or more embodiments, one or more of the interior components may be returned to its initial position or a designated home position, as represented by operation 420. As one example, the interior component may be returned to the position within the predetermined coordinate system that was mapped in operation 406.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle interior system comprising:
    a first seat assembly disposed within a vehicle cabin and including a motor configured to move at least a portion of the first seat assembly, wherein the motor is configured to output first signals indicative of a position of the portion of the first seat assembly within a predetermined coordinate system;
    a sensor disposed within the vehicle cabin and configured to output second signals indicative of a positioning of an obstacle within the predetermined coordinate system; and
    a controller configured to:
        receive the second signals from the sensor and assign first coordinates to the obstacle to map the position of the obstacle within the predetermined coordinate system based on the second signals,
        receive the first signals from the motor and assign second coordinates to the portion of the first seat assembly to map the positioning of the portion of the first seat assembly within the predetermined coordinate system based on the first signals,
        responsive to actuation of the motor, iteratively update the second coordinates of the portion to track movement of the portion, and
        stop the actuation of the motor responsive to a hinderance condition being detected, wherein the detection of the hinderance condition is based on a distance between the first and second coordinates and a speed of the movement of the portion of the first seat assembly.

2. The vehicle interior system of claim 1, wherein the motor is a length adjustment motor configured to provide the first signals.

3. The vehicle interior system of claim 2, wherein the first seat assembly further includes a recliner motor configured to move the first seat assembly, wherein the recliner motor is configured to output third signals to the controller indicative of a position of the portion of the first seat assembly within the predetermined coordinate system.

4. The vehicle interior system of claim 3, wherein the first seat assembly further includes a height adjustment motor configured to output fourth signals to the controller indicative of the portion of the first seat assembly to determine the positioning of the portion of the first seat assembly within the predetermined coordinate system based on the first signals, the third signals, and the fourth signals.

5. The vehicle interior system of claim 4, wherein the controller is further configured to record in memory the positioning of the portion of the first seat assembly.

6. The vehicle interior system of claim 1, further comprising:
    a second seat assembly including an adjustable headrest assembly having a headrest and a headrest motor, the headrest motor being configured to rotate in a first rotational direction to translate the headrest in a first direction and a second rotational direction to translate the headrest in a second direction, wherein the controller is configured to rotate the headrest motor in the second rotational direction to translate the headrest in the second direction from a first position to a second position, in response to meeting the hindrance condition.

7. The vehicle interior system of claim 6, wherein the controller is further configured to record in memory the positioning of the adjustable headrest assembly in the first position before rotating the headrest motor in the second direction.

8. The vehicle interior system of claim 7, wherein the controller is further configured to rotate the headrest motor in the first rotational direction to return the headrest to the first position.

9. The vehicle interior system of claim 1, wherein the sensor is a RADAR sensor.

* * * * *